United States Patent [19]

Speranza

[11] Patent Number: 4,947,331
[45] Date of Patent: Aug. 7, 1990

[54] UPSHIFT LOGIC

[75] Inventor: Donald Speranza, Canton, Mich.

[73] Assignee: Eaton Corporation, Cleveland, Ohio

[21] Appl. No.: 223,309

[22] Filed: Jul. 25, 1988

[51] Int. Cl.$^5$ .................. B60K 41/08; B60K 41/18
[52] U.S. Cl. ........................ 364/424.1; 74/866
[58] Field of Search ............... 364/424.1; 74/866, 720; 192/0.056, 0.076

[56] References Cited

U.S. PATENT DOCUMENTS

| | | | |
|---|---|---|---|
| 4,081,065 | 3/1978 | Smyth et al. | 192/0.076 |
| 4,361,060 | 11/1982 | Smyth | 74/866 |
| 4,425,620 | 1/1984 | Batcheller et al. | 364/424.1 |
| 4,569,255 | 2/1986 | Holmes | 74/866 |
| 4,576,065 | 3/1986 | Speranza et al. | 74/866 |
| 4,595,986 | 6/1986 | Daubenspeck et al. | 364/424.1 |
| 4,648,290 | 3/1987 | Dunkley et al. | 74/866 |
| 4,784,019 | 11/1988 | Morscheck | 74/720 |
| 4,823,643 | 4/1989 | Koshizawa | 74/866 |

FOREIGN PATENT DOCUMENTS

WO86/05449 9/1986 PCT Int'l Appl. ............ 364/424.1

Primary Examiner—Felix D. Gruber
Attorney, Agent, or Firm—H. D. Gordon

[57] ABSTRACT

An improved control system and method for an automatic/semi-automatic transmission system (10) including an automatic change gear transmission (12) driven by a throttle (26) controlled engine (14) is provided. The control system includes a processing unit (42) for receiving inputs indicating at least throttle positon (THL) and vehicle speed (OS) and for determining vehicle acceleration (dOS/dt) and for processing these inputs in accordance with a program or logic rules to determine the selected engaged gear ratio and for issuing command signals to a transmission shifting mechanism (34). The processing unit operates according logic rules so that the control system will execute skip upshifts upon sensing certain predetermined conditions.

14 Claims, 4 Drawing Sheets

| DRIVE RATIO | RATIO |
| --- | --- |
| 1 | 12.70 |
| 2 | 10.60 |
| 3 | 8.87 |
| 4 | 7.34 |
| 5 | 6.12 |
| 6 | 5.11 |
| 7 | 4.27 |
| 8 | 3.53 |
| 9 | 2.98 |
| 10 | 2.49 |
| 11 | 2.08 |
| 12 | 1.72 |
| 13 | 1.44 |
| 14 | 1.20 |
| 15 | 1.00 |
| 16 | .83 |
| LOW R | 11.69 |
| HIGH R | 8.15 |

FIG. 3

UPSHIFT LOGIC

BACKGROUND OF THE INVENTION

1. Field of the Invention

This invention relates to vehicular automatic and semi-automatic transmission systems providing a plurality of gear reduction ratios, such as automatic mechanical transmissions, and to control systems therefor. In particular, the present invention relates to control systems and methods for vehicles with throttle controlled engines and automatic or semi-automatic transmissions wherein gear selection and shift decisions are made and executed based upon measured and/or calculated parameters such as transmission output shaft or vehicle speed, transmission input shaft and/or engine speed, throttle position, calculated engine speed in a potentially engagable ratio, and the like. More particularly, the present invention relates to automatic/semi-automatic transmission control systems of the type described above having at least one mode of operation in which upshifting by more than a single ratio step will be commanded if conditions indicative of vehicle acceleration sufficient to indicate that single upshifting will result in a rapid requirement for further upshifting are sensed.

2. Description of the Prior Art

The use of automatic transmissions of both the automatic mechanical type utilizing positive clutches and of the planetary gear type utilizing frictional clutches is well known in the prior art as are control systems therefor. Electronic control systems for automatic transmissions wherein gear selection and shift decisions are made based upon certain measured and/or calculated parameters such as vehicle speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like are known in the prior art. Examples of such automatic transmission control systems for vehicles may be seen by reference to U.S. Pat. Nos. 4,722,248; 4,569,225; 4,595,986; 4,361,060; 4,073,203; 4,253,348; 4,038,889; 4,226,295; 3,776,048; 4,028,929; 4,039,061; 3,974,720 and 3,942,393, the disclosures of all of which hereby incorporated by reference.

Automated transmission systems having a selectable mode wherein skip downshifts, if allowable (i.e. engine speed in to be engaged ratio not greater than maximum allowable engine speed), assuming substantially constant vehicle speed, are selected are known in the prior art as may be seen by reference to U.S. Pat. No. 4,576,065, the disclosure of which is hereby incorporated by reference.

While the above referenced automatic transmission control systems, and similar systems, are effective to control an automatic transmission by selecting a desired gear ratio which will tend to optimize the fuel economy and/or performance of the vehicle in view of the sensed parameters and then to command a shift into the selected gear ratio, such control systems were not totally acceptable as the predetermined programs utilized to generate shift decision data, such as a shift pattern or patterns (also commonly referred to as a shift point profile) or the like did not optimize vehicle performance when vehicle acceleration (usually sensed as rotational acceleration of the transmission output shaft) sufficient to cause undesirably frequent single upshifting is sensed. If vehicle acceleration is such that, if only a single upshift is commanded, an additional upshift will be required in less than a reference period of time, vehicle performance will be unsatisfactory as the frequent shifting will be a nuisance and, in a mechanical transmission, the overly frequent torque interruptions during shift transients is inefficient.

SUMMARY OF THE INVENTION

In accordance with the present invention, the drawbacks of the prior art have been overcome or minimized by providing a control system and method, preferably an electronic control system, for automatic transmissions, such as automatic/semi-automatic mechanical transmissions, wherein gear selection and shift decisions are made and executed based upon measured and/or calculated parameters including current input shaft and/or engine speed, throttle position, output shaft or vehicle speed and/or the rate of change thereof and wherein the predetermined program by which shift commands are generated has at least one mode of operation wherein upshifts by more than one ratio (i.e. "skip upshifts") will be commanded if conditions indicative of rapid vehicle acceleration sufficient to cause undesirably rapid repeated single upshifts are sensed.

The above is accomplished by providing an automatic/semi-automatic transmission control system including a central processing unit (CPU) generating shift commands based upon sensed or calculated parameters such as engine speed, currently engaged gear ratio, output shaft speed, and throttle position. The control system will automatically evaluate, initiate and complete an upshift through more than a single gear ratio to improve vehicle performance when the time required for an upshift from the next higher gear ratio, assuming acceleration to equal a value based upon existing acceleration, is less than a reference period of time. In this mode or modes of operation, upon reaching an engine speed at which an upshift is indicated, the control will calculate/sense the rate of vehicle acceleration and throttle position, and, if conditions warrant, command initiation of an upshift to the Nth (where N is a whole number greater than one (1), usually (2) or three (3)) higher ratio if the calculated expected engine speed at the end of the reference period of time, assuming substantially constant vehicle acceleration, in the next higher ratio exceeds the engine speed, assuming constant throttle position, at which an upshift is required.

The control will thus initiate a skip upshift if sufficient vehicle acceleration is sensed and, preferably, will not complete the skip upshift unless the vehicle is accelerating sufficiently to avoid an immediate downshift.

If a skip upshift is not allowable, a single upshift to the next higher ratio will be commanded.

To avoid skip upshifting during a coasting condition, skip upshifts will only be performed if throttle position exceeds a predetermined minimal value.

Accordingly, it is an object of the present invention to provide a new and improved control system and method for automatic/semi-automatic transmission systems which will sense vehicle operating conditions conducive to a skip upshift and which, in such conditions, will select allowable skip upshifts.

This and other objects and advantages of the present invention will become apparent from a reading of the description of the preferred embodiment taken in connection with the attached drawings.

BRIEF DESCRIPTION OF THE DRAWINGS

FIG. 3 table illustrating the ratio of input shaft speed to outshaft shaft speed of a typical automatic mechanical transmission in the various drive ratios thereof.

DESCRIPTION OF THE PREFERRED EMBODIMENT

Figure 1:
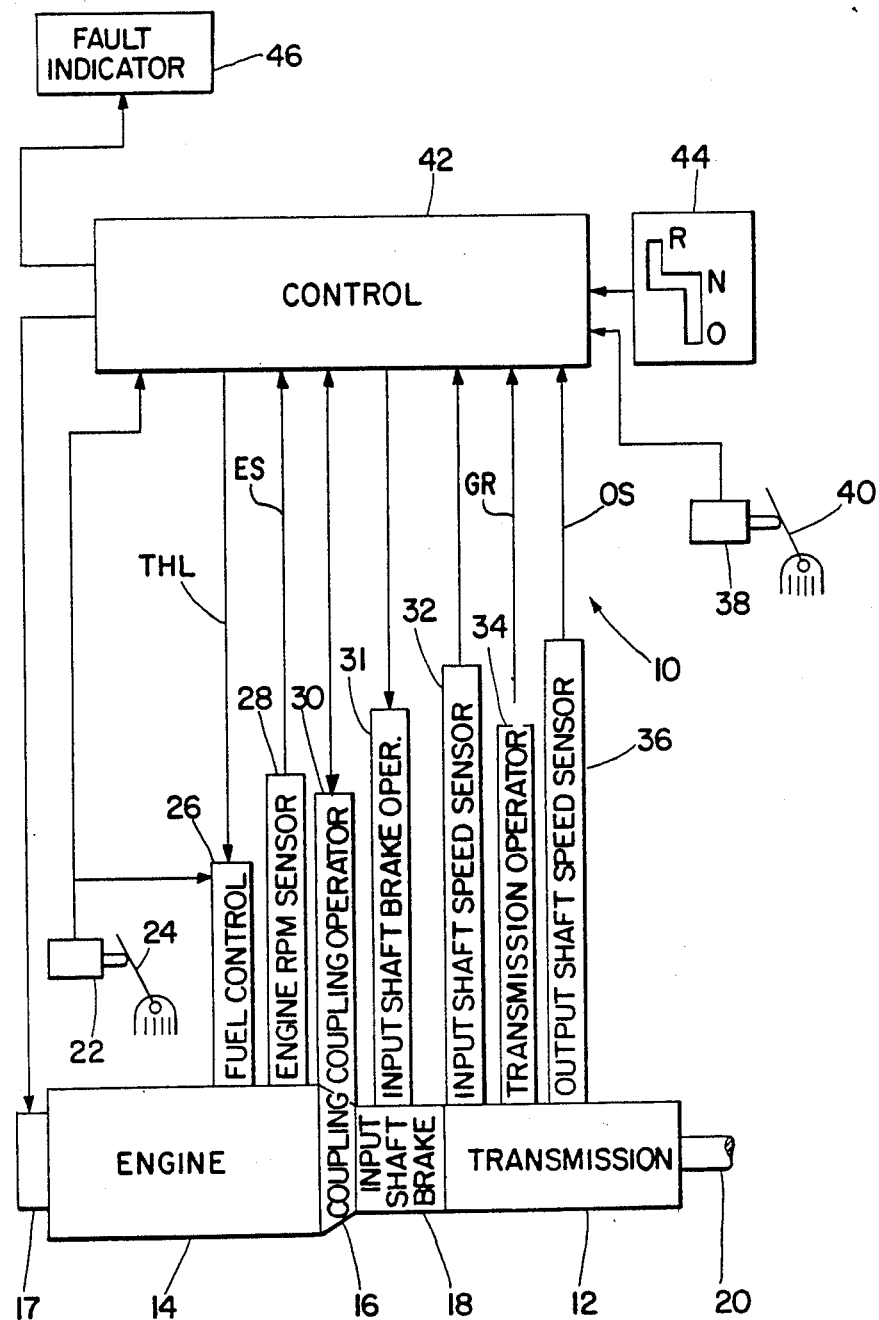
FIG. 1 is a schematic illustration of the components and interconnections of the automatic/semi-automatic mechanical transmission control system of the present invention.

FIG. 1 schematically illustrates an automatic mechanical transmission system 10 including an automatic multi-speed compound change gear transmission 12 driven by a fuel controlled engine 14, such as a well known diesel engine, through a coupling such as torque converter and/or master clutch 16. An engine brake such as an exhaust brake 17 for retarding the rotational speed of engine 14 and/or an input shaft brake 18 which is effective to apply a retarding force to the transmission input shaft upon disengagement of master clutch 16 may be provided as is known in the prior art. The output of automatic transmission 12 is output shaft 20 which is adapted for driving connection to an appropriate vehicle component such as the differential of a drive axle, a transfer case, or the like as is well known in the prior art.

The above mentioned power train components are acted upon and monitored by several devices, each of which will be discussed below. These devices include a throttle pedal position or throttle opening monitor assembly 22 which senses the position of the operator controlled throttle device 24, a fuel control device 26 for controlling the amount of fuel to be supplied to engine 14, an engine speed sensor 28 which senses the rotational speed of the engine, a clutch operator 30 which engages and disengages clutch 16 and which also supplies information as to the status of the clutch, an input brake operator 31, a transmission input shaft speed sensor 32, a transmission operator 34 which is effective to shift the transmission 12 into a selected gear ratio and to provide a signal indicative of the gear neutral condition and/or the currently engaged gear ratio, and a transmission output shaft speed sensor 36. A vehicle brake monitor 38 senses actuation of the vehicle brake pedal 40.

It is understood that clutch 16 could be replaced by a hydromechanical device, such as a torque converter, and that such torque converter could be equipped with by-pass, lock-up and/or disconnect devices.

The above mentioned devices supply information to and/or accept commands from a central processing unit 60 or control 42. The central processing unit 42 may include analog and/or digital electronic calculation and logic circuitry, the specific configuration and structure of which forms no part of the present invention. The central processing unit also receives information from a shift control assembly 44 by which the vehicle operator may select a reverse (R), neutral (N), or forward drive (D) mode of operation of the vehicle. An electrical power source (not shown) and/or a source of pressurized fluid (not shown) provides electrical and/or pneumatic power to the various sensing, operating and/or processing units. A fault indicator or alarm 46 may display the identity of a specific fault or simply signal the existence of an unidentified fault. Drive train components and controls therefor of the type described above are known in the prior art and may be appreciated in greater detail by reference to above-mentioned U.S. Pat. Nos. 4,722,248; 4,595,986; 4,569,225; 4,576,065; 4,445,393; 4,361,060; 3,776,048; 4,038,889 and 4,226,295.

Sensors 22, 28, 32, 36, 38 and 40 may be of any known type or construction for generating analog or digital signals proportional to, or indicative of, the parameter monitored thereby. Similarly, operators 17, 18, 26, 30 and 34 may be of any known electric, pneumatic or electro-pneumatic type for executing operations in response to command signals from the central processing unit 42 and/or for providing input signals thereto. Fuel control 26 will normally supply fuel to engine 14 in accordance with the operator setting of throttle pedal 24 but may supply a lessor (fuel dipped) or greater (fuel boost) amount of fuel in accordance with commands from the central processing unit 42.

Clutch operator 30 is preferably controlled by the central processing unit 42 and may engage and/or disengage master clutch 16 as described in above-mentioned U.S. Pat. No. 4,081,065. Of course, operator 30 could also be an operator for torque converter by-pass, lock-up and/or disconnect devices as illustrated in allowable U.S. application Ser. No. 006,303 filed Jan. 15, 1987, now U.S. Pat. No. 4,784,019 the disclosure of which is hereby incorporated by reference. Transmission 12 may include synchronizing means, such as an accelerator and/or a brake mechanism as described in U.S. Pat. Nos. 3,478,851 and 4,676,115, the disclosures of both of which are hereby incorporated by reference. Transmission 12 is preferably, but not necessarily of the twin countershaft type as is seen in U.S. Pat. Nos. 3,105,395; 4,648,290 or 4,735,109.

In addition to direct inputs, the central processing unit may be provided with circuitry for differentiating the input signals from sensors 28 and/or 36 to provide a calculated signal indicative of the rate of acceleration of the engine and/or vehicle, respectively, means to compare the input signals from sensor 32 and 36 to calculate a current engaged gear ratio, circuit means to compare the current engaged gear ratio with the signal from sensor 36 to provide a calculated engine speed, means to sense full throttle, and means to calculate an expected engine speed in a given engaged ratio and at a given or sensed output shaft speed.

The central processing unit is also provided with comparison means for comparing sensed or calculated signals to fixed or variable reference values.

In the automatic mechanical transmission system illustrated in FIG. 1, a purpose of the central processing unit is to select, in accordance with predetermined logic rules and current or stored parameters, the optimum gear ratio at which the transmission should be operating and, if necessary, to command a gear change, or shift, into the selected optimal gear ratio based upon the current and/or stored information. FIG. 3 illustrates the ratio of the input shaft speed to the output shaft speed in a 16-forward speed and 2-reverse drive ratio type of transmission typically utilized with heavy duty vehicles and suitable for use in the automatic mechanical transmission system 10 illustrated in FIG. 1. Although not necessary, it may be seen that the steps or splits between forward ratios are approximately twenty percent (20%).

As indicated above, one of the principle functions of the control unit 42 of the automated mechanical transmission system is to make decisions as to the proper gear ratio that should be selected and engaged in transmission 12 based upon driver demands and vehicle operating conditions. Ideally, transmission system 10 utilizes an electronic control unit 42 preferably microprocessor based, which can be programmed to enhance specific vehicle characteristics.

Figure 2:
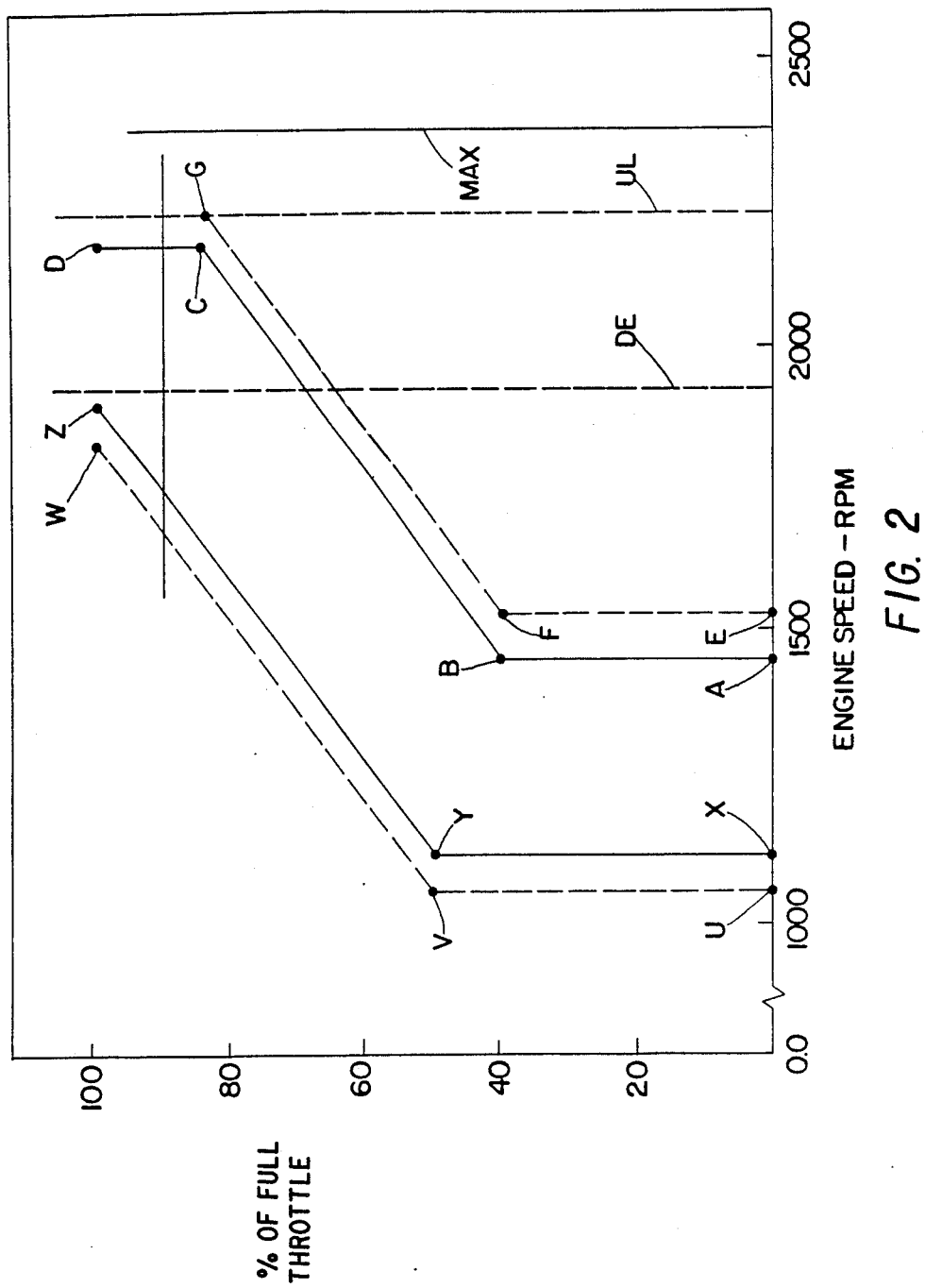
FIG. 2 is a graph of engine speed versus throttle position illustrating shift patterns, or shift point profiles, of the type generated/calculated by control systems of automated mechanical transmissions.

One method by which shift decisions are made is for the central processing unit program or logic rules to generate shift patterns, or shift point profiles, as seen in FIG. 2. The shift point profiles generated by the central processing unit will determine if the transmission should remain in the currently engaged gear ratio, should be upshifted to at least the next highest gear ratio or should be downshifted to at least the next lower gear ratio. The shift point profiles are determined by a predetermined program acting upon current or stored information and are usually selected to provide a compromise between operation at the most fuel efficient possible gear ratio and operation in a gear ratio providing optimal performance characteristics of the vehicle. Shift point profiles illustrated in FIG. 2 are a function of throttle position, expressed as a percentage of maximum throttling position, and of engine speed. The engine speed may be directly sensed or, preferably, is a calculated engine speed (i.e. based upon output shaft speed and engaged gear ratio) which will not vary during a shift transient as is known in the prior art.

As used herein a "higher gear ratio" or "higher drive ratio" will refer to a gear or drive ratio having a lower ratio of input shaft speed to output shaft speed. For example, tenth (10th) gear is higher than ninth (9th) gear and the shift from ninth gear to tenth gear is an upshift. Similarly, a shift directly from eighth gear to tenth gear is a skip upshift wherein one ratio (i.e. 9th speed) is skipped. A shift directly to tenth speed from seventh speed is a skip upshift wherein two ratio steps are skipped.

The control 42 may have a singular operating mode or may have two or more modes including an over-the-highway mode and an off-highway mode either of which may be selected by the operator. The skip upshift logic of the present invention may be utilized in all or just selected modes of operation. The shift point profile illustrated in FIG. 2 are based upon transmission control system having both an on-highway and off-the-road mode of operation.

Both the on-highway (A-B-C-D and X-Y-Z) and off-road (E-F-G and U-V-W) shift profiles provide the basis for shifting the transmission 12 as a function of speed modulated by the driver controlled throttle position. Both sets of profiles are primarily derived the characteristics of the engine including the effects of all engine driven auxiliaries. The engine speed (ES) signal, shown in terms of engine RPM, is preferably derived by multiplying the transmission output shaft signal by the numeric value of the gear ratio (GR) of the drive ratio currently selected by the control electronics. Throttle position (THL) is shown as a percentage of full throttle from zero percent (0%) to one hundred percent (100%).

The shift profiles include an on-highway upshift line A-B-C-D and an on-highway downshift line X-Y-Z. Briefly, for operating conditions within the space bounded by downshift line X-Y-Z and upshift line A-B-C-D, no gear change is required, for operating conditions at or to the right of upshift line A-B-C-D an upshift to at least the next highest gear ratio is required and for operating conditions within the area at or to the left of downshift line X-Y-Z, a downshift to at least the next lowest gear ratio is required. It is understood, of course, that a single shift point profile may be utilized for all gear ratios of a transmission or a separate shift profile may be generated for each currently engaged gear ratio. Generally, the greater the difference in ratio splits between the gears, the greater the desirability of separate shift point profiles for each currently engaged gear ratio.

Other sensed or calculated monitored speeds, such as input shaft speed, output shaft speed, vehicle speed or the like may be substituted for engine speed in the shift point profiles illustrated in FIG. 2. Also, upshift and downshift lines are preferably not static but are dynamic. Dynamically moving shift point profile lines are known, and are discussed in greater detail in above-mentioned U.S. Pat. No. 4,361,060. Typically, the shift point lines are moved in response to current and/or stored information such as direction of a last shift, acceleration of the vehicle, acceleration of the engine, rate of change of throttle position, operation of the vehicle brake or the like.

It is important to understand that the shift point profiles are dependent upon the throttle position as well as the engine speed. Other than selecting a reverse, neutral or a forward drive mode of operation of the vehicle by manipulation of selector 44, the operator's only input to the transmission is his manipulation of the throttle pedal or other fuel control as the case may be. Accordingly, by setting shift profiles and modifying same in partial response to throttle position, the operator's desires are accounted for at a central processing unit 42 in deciding the optimal gear ratio at which the transmission 12 is to operate.

The shift point profiles also include an upshift limit (UL) at which the transmission must be upshifted to prevent impending speed related damage to the engine and a downshift enable limit (DE) above which the transmission must not be downshifted to prevent speed related damage to the engine. The upshift limit (UL) and downshift enable (DE) are not functions of throttle position. Line MAX indicates the engine speed in which engine damage is expected. Referring to the on-highway mode, upshifts occur as the operating point moves to the right of the A-B-C-D or UL profiles. Downshifts occur if the operating point moves to the left of the DE and the X-Y-Z profiles. All of these profiles, shown in the normal position, are subject to movement and response to various signals as discussed in greater detail in above-mentioned U.S. Pat. No. 4,361,060.

With a step change transmission, the ratio of engine speeds between any two gears is fixed by the ratio step or split (ratio of gear ratios). With profiles located as previously described, each upshift would lead to an operating point located on or near the downshift lines for the next high gear and vice versa. Hunting between gears would be inevitable. Some additional separation between the upshift and downshift profiles is desirable and acceptable; however, sufficient separation to eliminate hunting can result in an undesirable reduction in fuel economy. To overcome this problem, the control moves the shift profiles as a consequence of a shift. For a limited period of time after an upshift, the downshift profile is moved towards lower engine speeds. For a limited period of time after a downshift, the upshift profiles are moved towards higher engine speeds.

Preferably, as indicated above, the engine speed is a calculated rather than an actual engine speed, corresponding to the engine speed at drive train lock up conditions, which is determined by multiplying the output shaft speed by the appropriate gear ratio. The use of a calculated rather than an actual engine speed is preferred as actual engine speeds will vary during shift transients and the like.

While operation of the transmission in accordance with the above procedure is satisfactory for most normal on-highway conditions, in road conditions wherein a grade must be descended by a vehicle and/or the vehicle is relatively lightly loaded, the vehicle performance in the above-described operation is often unsatisfactory. Under such conditions, a shift logic which upshifts by a single step only and/or which is based upon assumed constant vehicle speed may not provide acceptable operation as rapid repeated upshifts may be required which tend to be objectionable, the ratio of time in gear to time out of gear is lower than desired and/or the allowable ratio providing maximum acceleration may not be selected.

To overcome this drawback (in at least the selectable performance modes of operation) the improved control system of the present invention operates on a program or procedure by which an upshift of N (N equalling a whole number greater than one, preferably two or three) steps is commanded when conditions indicating that a single upshift will result in an undesirably rapid requirement for a further upshift due to vehicle acceleration is sensed.

Conditions conducive for skip upshifting exist if, when an upshift is indicated and the throttle setting (THL) exceeds a reference value (REF$_{THL}$), assuming vehicle acceleration remains at a value determined by sensed vehicle acceleration, the calculated engine speed in the next higher gear ratio (GR+1) at the end of a reference period of time (REF$_T$) exceeds the engine speeds at which upshifts are commanded from the next higher ratio, assuming substantially constant throttle position.

In such situations, a shift to the Nth higher gear, N equalling two or three, is commanded.

The value of the reference throttle value (REF$_{THL}$) is relatively low as requiring THL to exceed REF$_{THL}$ is intended to prevent skip upshifting in coasting downhill conditions. The assumed vehicle acceleration is a function of, preferably equality, the sensed vehicle acceleration and may be sensed by the value of dOS/dt. The reference period of time (REF$_T$) is selected in view of vehicle parameters, the rapidity of shifting perceived as undesirable and/or the maximum efficient ratio of out of gear-to-in gear time. The value of REF$_T$ may vary with vehicle speed, throttle setting (THL) and/or engaged gear ratio (GR).

Preferably, just prior to completion of the upshift to the Nth higher gear ratio, that is prior to actual engagement of the Nth higher gear ratio, the central processing unit will again evaluate the expected engine speed at the then current vehicle speed and command completion of the initiated skip upshift only if calculated expected engine speed is not less than the engine speed at which downshifts are commanded from the Nth higher ratio at current throttle position.

Figure 4:
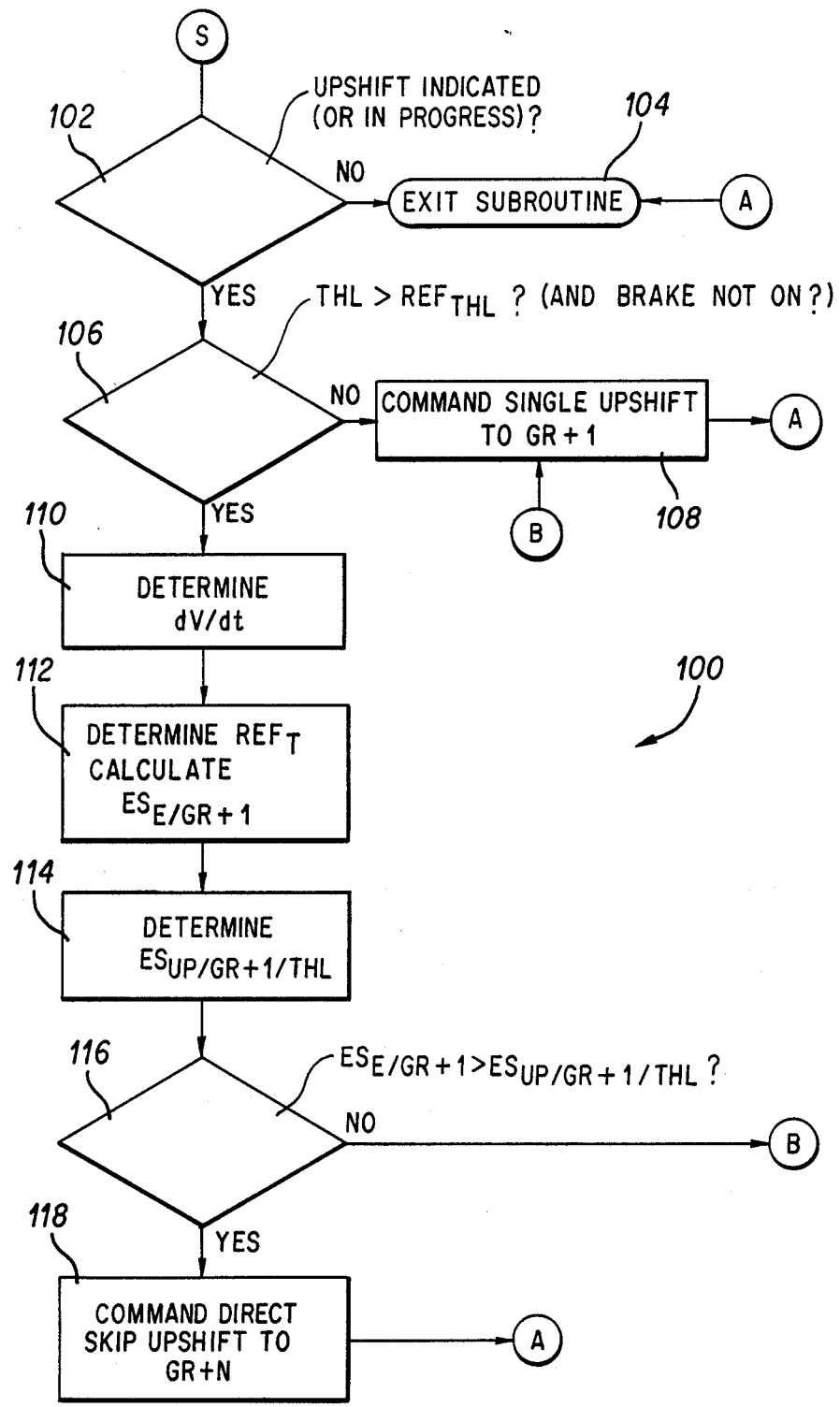
FIG. 4 is a symbolic illustration, in the form of a flow chart, illustrating the preferred manner of practicing the present invention.

Symbolic illustration of the present invention, in flow chart format, may be seen by reference to FIG. 4. Starting at point S, the skip upshift logic subroutine 100 determines at 102 if an upshift is required, and, if not, the subroutine is exited at 104. Alternatively, the subroutine can be entered only upon a logic determination that a upshift is required.

At 106 it is determined if THL is greater than the reference value REF$_{THL}$, and, preferably, if the brakes are not applied. If either of these conditions are not true, a single upshift is commanded at 108. If THL is greater than the REF$_{THL}$ value, and the brakes are not applied, at 110 the value of vehicle acceleration, or a representative value such and dOS/dt is calculated.

At 112, the reference time period (REF$_T$) is determined and an expected engine speed in the next higher gear ratio (GR+1) at time equals REF$_T$; ES$_{E/GR+1}$; is calculated based upon a calculated vehicle acceleration [(dv/dt)$_C$] which is a function of sensed vehicle acceleration dv/dt.

At 114, the engine speed at which upshifts are commanded from the next higher ratio at substantially constant throttle position ES$_{UP/GR+1/THL}$ is determined.

At 116, ES$_{E/GR+1}$ is compared to ES$_{UP/GR+1/THL}$. If expected engine speed does not exceed the upshift engine speed, a single upshift is commanded and the subroutine exited. If expected engine speed does exceed the upshift engine speed, a skip upshift to GR+N is commanded at 118. The subroutine is then exited.

Alternatively, as a logic loop such as loop 100 requires only about fifty (50) milliseconds to complete, a loop which would continue to test for acceptable conditions in a progressively higher ratio, until unacceptable conditions were found, could be utilized. Upon finding unacceptable conditions, assuming the estimated acceleration, the logic would command a shift directly into the highest acceptable ratio assuming the estimated vehicle acceleration.

Although the present invention has been set forth with a certain degree of particularity, it is understood that various modifications are possible without departing from the spirit and scope of the invention as hereinafter claimed.

I claim:

1. An automated transmission system for vehicles having a fuel supply controlled engine, a throttle controlling means for controlling the amount of fuel supplied to the engine and a transmission having a plurality of gear ratio combinations selectively engageable between a transmission input shaft and a transmission output shaft, said transmission input shaft being operatively connected to said engine by a coupling device, said transmission system including an information processing unit having means for receiving a plurality of input signals including (1) an input signal indicative of the position of said throttle controlling means, and (2) an input signal indicative of the speed of said vehicle, said processing unit including means for processing said input signals in accordance with predetermined logic rules to select a desirable gear ratio for a given combination of input signals, to provide a value indicative of the acceleration of the vehicle, and for generating command output signals whereby said transmission system is operated in accordance with said predetermined logic rules, and means associated with said transmission effective to actuate said transmission to effect engagement of one of said gear ratio combinations in response to said output signals from said processing unit, the improvement characterized by:

said processing unit having means for defining a subroutine, effective upon sensing conditions at which an upshift from the currently engaged rear ratio is normally required, effective to:

determine an estimated value of continuing vehicle acceleration;

determine if, during a reference period of time, conditions at which an upshift from the next higher gear ratio (GR+1) is required will occur if an upshift to the next higher gear ratio is performed and the vehicle continues to accelerate at at least said estimated value of continuing vehicle acceleration;

compare the position of the throttle controlling means to a throttle position reference value, and (i) if the position of the throttle controlling means does not exceed said reference value, command an upshift to the next higher gear ratio (GR+1), and (ii) if the position of the throttle control exceeds said throttle position reference value and it is determined that during said reference period of time conditions at which an upshift from the next higher gear ratio is required will occur if an upshift to said next higher gear ratio is performed and the vehicle continues to accelerate at at least said estimated value of continuing vehicle acceleration, command a direct skip upshift to a gear ratio (GR+N, where N equals a whole number greater than one) higher than the next higher gear ratio, otherwise command an upshift to the next higher gear ratio (GR+1).

2. The system of claim 1 wherein said estimated value of vehicle acceleration is determined as a function of currently sensed vehicle acceleration.

3. The system of claim 1 wherein said throttle position reference value is equal to greater than twenty percent (20%) of full throttle.

4. The system of claim 1 wherein said reference period of time is variable with currently engaged ratio (GR).

5. The system of claim 1 wherein said reference period of time is variable with vehicle velocity.

6. The system of claim 1 wherein said reference period of time is variable with throttle position.

7. A control method and automated transmission system for vehicles having a throttle-controlled engine, a throttle controlling means for controlling the amount of fuel supplied to the engine and a transmission having a plurality of gear ratio combinations selectively engageable between a transmission input shaft and a transmission output shaft, said transmission input shaft being operatively connected to said engine by a coupling device, said transmission system including an information processing unit having means for receiving a plurality of input signals including (1) an input signal indicative of the position of said throttle controlling means, and (2) an input signal indicative of the speed of said vehicle, said processing unit including means for processing said input signals in accordance with predetermined logic rules to select a desirable gear ratio for a given combination on input signals, to provide a value indicative of the acceleration of the vehicle, and for generating command output signals whereby said transmission system is operated in accordance with said predetermined logic rules, and means associated with said transmission effective to actuate said transmission to effect engagement of one of said gear ratio combinations in response to said output signals from said processing unit, the method characterized by:

sensing conditions at which an upshift from he currently engaged gear ratio (FR) is normally required, effective to:

determining an estimated value of continuing vehicle acceleration;

determining if, during a reference period of time, conditions at which an upshift from the next higher gear ratio (GR+1) is required will occur if an upshift to the next higher gear ratio is performed and the vehicle continues to accelerate at at least said estimated value of continuing vehicle acceleration;

comparing the position of the throttle controlling means to a throttle position reference value; and (i) if the position of the throttle controlling means does not exceed said reference value, commanding an upshift to the next higher gear ratio (GR+1), and (ii) if the position of the throttle control exceeds said throttle position reference value and it is determined that during said reference period of time conditions at which an upshift from the next higher gear ratio is required will occur if an upshift to said next higher gear ratio is performed and the vehicle continues to accelerate at at least said estimated value of continuing vehicle association, commanding a direct skip upshift to a gear ratio (GR+N, where N equals a whole number greater than one) higher than the next higher gear ratio, otherwise commanding an upshift to the next higher gear ratio (GR+1).

8. The method of claim 7 wherein said estimated value of vehicle acceleration is determined as a function of currently sensed vehicle acceleration.

9. The method of claim 7 wherein said throttle position reference value is equal to greater than twenty percent (20%) of full throttle.

10. The method of claim 7 wherein said reference period of time is variable with currently engaged ratio (GR).

11. The method of claim 7 wherein said reference period of time is variable with vehicle velocity.

12. The system of claim 7 wherein said reference period of time is variable with throttle position.

13. The system of claim 1 wherein said information processing unit also receives (3) an input signal indicative of application of vehicle brakes and said program is effective to select a direct skip upshift only when said vehicle brake signal indicates said vehicle brakes are not applied.

14. The method of claim 7 wherein said information processing unit also receives (3) an input signal indicative of application of vehicle brakes and a direct skip upshift is commanded only when said vehicle brake signal indicates said vehicle brakes are not applied.

* * * * *